United States Patent [19]

Fischer

[11] 4,182,650
[45] Jan. 8, 1980

[54] PULSED NUCLEAR FUSION REACTOR

[76] Inventor: Albert G. Fischer, Preinstr. 132, 46 Dortmund-Wellinghofen, Fed. Rep. of Germany

[21] Appl. No.: 421,052

[22] Filed: Dec. 3, 1973

Related U.S. Application Data

[63] Continuation-in-part of Ser. No. 361,211, May 17, 1973, abandoned.

[51] Int. Cl.$^2$ .............................................. G21B 1/00
[52] U.S. Cl. ......................................... 176/8; 176/1; 176/9
[58] Field of Search ........................... 176/1, 3, 6, 8, 9

[56] References Cited

U.S. PATENT DOCUMENTS

| | | | |
|---|---|---|---|
| 3,214,342 | 10/1965 | Linhart | 176/8 |
| 3,313,707 | 4/1967 | Amsler | 176/8 |
| 3,748,475 | 7/1973 | Shatas et al. | 176/1 |

OTHER PUBLICATIONS

Matt—1050, 8/74, pp. 526–529.
Technology Review, 12/76, pp. 20-24, 32, 33, 39, 42, 43.
Wash—1267, 7/73, pp. 3–10.
Nsenao—54, No. 2, 10/75, pp. 107, 108, 119, 120, 162–165.

*Primary Examiner*—Harvey E. Behrend
*Attorney, Agent, or Firm*—Lane, Aitken & Ziems

[57] ABSTRACT

This invention relates to a nuclear fusion power plant for producing useful electrical energy by nuclear combustion of deuterium and lithium to helium. A large concentric plate capacitor is discharged rapidly through a mass of molten $LiD_{1-x}T_x$ ($0<X<1$) that is situated at its center. Before this discharge, a conducting path had been thermally preformed between the electrodes by an ac current pulse. The high-temperature, high-pressure plasma is confined by the LiD liquid in a narrow channel. Neutrons are generated, partly by thermonuclear fusion, partly by suprathermal collisions which result from the well-known sausage instability. Short $n$-$^6$Li-D-T chain reactions, enhanced by the beryllium content of the electrodes, are also present. The escaping neutrons are absorbed by the surrounding liquid where they breed T, which is then chemically bound, and produce heat. The heat, radiation and mechanical shock are absorbed in the liquid which flows through a heat exchanger in order to energize the associated turbogenerator power plant. After each pulse, the discharge channel vanishes and is homogenized in the liquid. This reactor cannot become supercritical, and does not produce radioactive waste.

13 Claims, 2 Drawing Figures

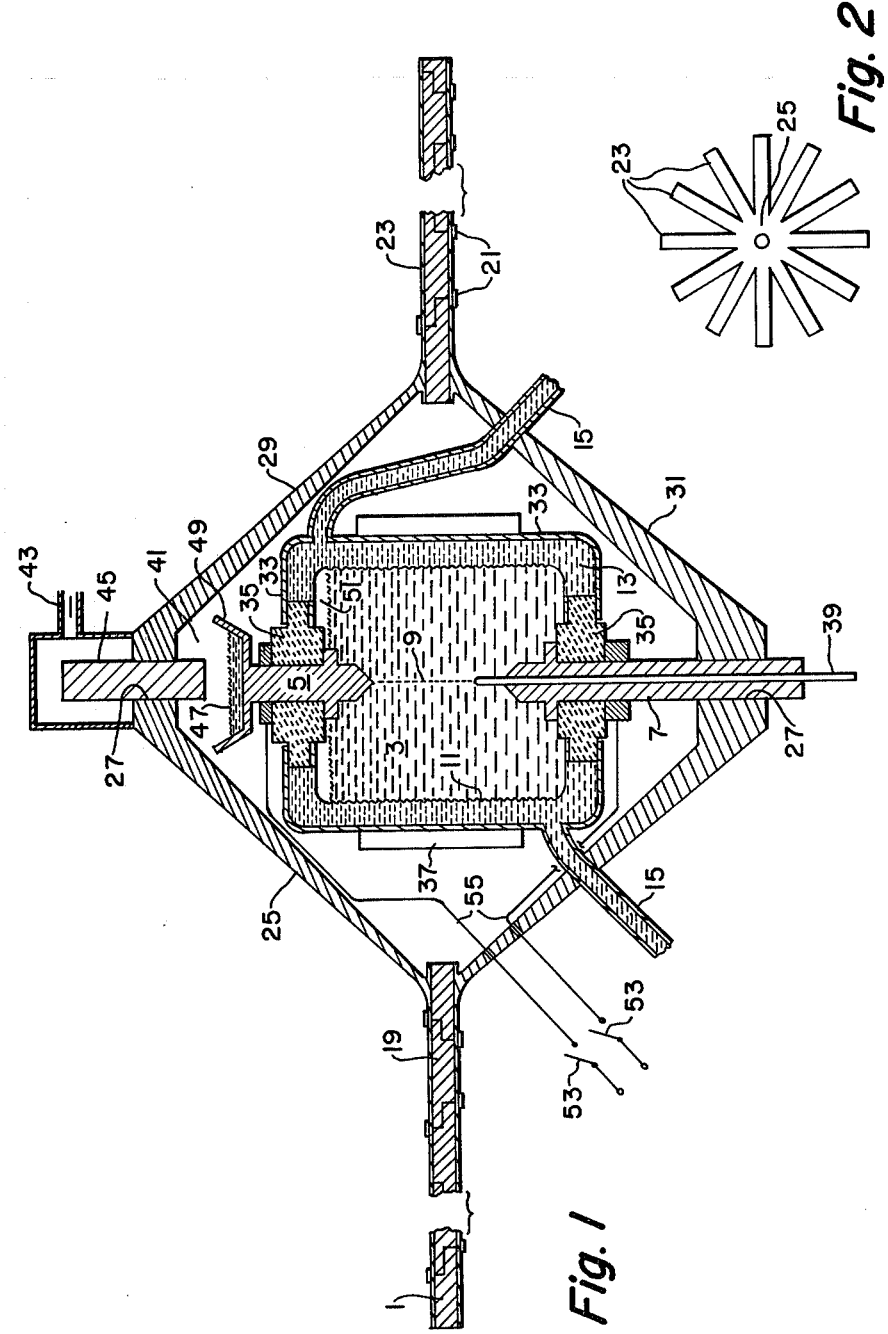

PULSED NUCLEAR FUSION REACTOR

CROSS-REFERENCES TO RELATED APPLICATIONS

This application is a continuation-in-part of my co-pending application Ser. No. 361,211, filed May 17, 1973, now abandoned.

BACKGROUND OF THE INVENTION

It is well known that the deuterium content of each liter of common water, if fused to helium, can release as much energy as the combustion of 300 liters of gasoline. In recognition of this fact, huge government-funded research programs have been conducted since 1956 in most industrialized nations, without tangible success. But even if nuclear fusion of technically useable magnitude had been achieved, the complex laboratory machines used would have deteriorated rapidly under the heavy neutron flux, and the reaction heat could not have been recuperated for conversion into electrical power via thermodynamic plants.

In my German Pat. No. 1 022 711 of 1956 I have already proposed to protect the load-carrying walls of the nuclear reaction vessel from neutron damage and from mechanical damage by the shock waves, by a thick layer of a liquid metal which could also be used to absorb the heat and conduct it to the associated turbogenerator. In my above-mentioned patent application I have proposed that not a liquid metal layer but a layer of the poorly conducting molten salt $^6LiD_{1-x}T_x (0 < X < 1)$ be used for wall protection, with important additional advantages. This liquid which now forms the self-renewable walls of the nuclear explosion chamber, does not only absorb the escaping thermonuclear neutrons, but is can also convert them, with energy gain, into tritium T by means of fission of $^6Li$. The T is then chemically bound, for participation in the next power stroke. The D-T fusion proceeds much easier than the D-D fusion, and the T-T fusion may go even easier than D-T. The high-temperature stability of molten LiD around 1000° C. is favorable for thermodynamic power plant efficiency. LiD cannot become dangerously radioactive, and its high resistivity (compared to metals) makes it possible to form narrow electrical discharge channels in it.

In my above-cited foregoing patent applications, the nuclear fusion conditions were assumed to be achievable by means of the mechanical and magnetic compression that is created by current flow along the walls of a deuterium-tritium-filled cavity that had been generated in the liquid-filled interelectrode space before each discharge. In the present disclosure, the fusion conditions are produced more simply, namely by just discharging the capacitor through the liquid using a preformed conductivity path. The apparatus used is generally similar to the previous one. A new addition is that the electrodes can contain beryllium, for neutron multiplication. Also, it is recognized now that the efficiency of the machine is greater than originally assumed, because of the occurrence of short nuclear chain reactions in the Li-D-T plasma channel, with the concomitant additional heat.

Supporting evidence for the scheme of the invention has been found in the publications of F. C. Young et al, IEEE Trans. Nuclear Science NS-20, Page 439, February 1973, and by D. Y. Cheng, Nuclear Fusion 13, Page 129, January 1973. These authors report the generation of thermonuclear neutrons in D-containing wire explosions. The pulsed operation proposed by me in 1956 has recently been advocated by Edward Teller, IEEE Spectrum, January 1973, p. 60.

SUMMARY OF THE INVENTION

A concentric plate capacitor which can have a high-ε dielectric such as hot-pressed lead-zirconate-titanate, and which is charged to about 100,000 volt, is rapidly discharged through a molten mass of LiD that is enriched in the lithium isotope 6 and in the hydrogen isotope 3. This liquid is contained at the center of the capacitor, between the electrodes, which are bulged outward there. The discharge channel is preformed, before the capacitor discharge, by RF heating. The abruptly-rising, extremly high current creates a plasma channel of high temperature and pressure. The current constricts itself due to its own magnetic forces. It is prevented from escaping sideways (kink-effect) by the surrounding liquid. The well-known other instability, the sausage-effect, does occur and leads to the generation of suprathermal fusion events. In the plasma channel, fusion and fission chain reactions occur of the type that are known from the hydrogen bomb. The neutrons which hit the electrodes are multiplied by fission of Be into neutrons and alpha particles. These conditions are known since 1950 (see Ulrich Jetter, Physikalische Blatter 6, 199 (1950), recently confirmed by R. McNally, Jr., in the article on nuclear fusion in *Encyclopedia of Chemistry*, Van Nostrand Reinhold Co, 1973). At the end of each power pulse, the tritium that is generated by the neutrons which were captured in the LiD liquid, is chemically bound, and the discharge channel is wiped out and homogenized by turbulence in the liquid. The heat is transferred to the surrounding jacket of liquid lithium, which conducts it to the associated turbogenerator power plant, via heat exchangers.

BRIEF DESCRIPTION OF THE DRAWINGS

For a better understanding of the invention, reference may be had to the preferred embodiments exemplary of the invention in the accompanying drawing, in which:

FIG. 1 is a schematic cross section through the fusion reactor,

FIG. 2 is a reduced, schematic top view of the concentric capacitor, here shown in its embodiment with plates consisting of radial lobes.

DESCRIPTION OF THE PREFERRED EMBODIMENTS

The technical solution of the long-standing problem of controlled nuclear fusion, which would permit the combusion of the abundantly available deuterium to helium without radioactive waste, is of enormous importance. In recognition of this, billions of tax dollars have been spent to solve this problem. However, the approaches chosen in the many large-scale experiments were unsuitable and did not lead to success. If one studies the machines so far built, it becomes clear that even if nuclear fusion of technically useable magnitude had been achieved, the practical utilization would not have been possible, because these machines would have deteriorated rapidly under the intense neutron flux (neutrons displace the atoms from their lattice sites in structural materials, thus weakening them), X-radiation and mechanical shock waves, and the reaction heat could not have been recuperated for energizing the associated steam engines.

Reviews of the conducted research programs and results (or nonresults) can be found in the following publications: "Prospects for Fusion Power", by R. F. Post, Physics Today, April 1973, page 31, "The Prospects of Fusion Power", by W. C. Gough and B. J. Eastlund, Scientific American 224, Feb. 1971 page 50, "The Promise of Controlled Fusion", by R. G. Mills, IEEE Spectrum, Nov. 1971 page 24, "Outlook for Controlled Fusion Power", by J. L. Tuck, Nature 233, Oct. 29, 1971 page 595, "Controlled Nuclear Fusion: Status and Outlook", by D. J. Rose, Science 172, May 1971 page 797, "Fusion by Laser", by M. J. Lubin and A. P. Fraas, Scientific American 224, June 1971 page 21, and in the book "*Controlled Thermonuclear Reactions*", by S. Glasstone and R. H. Lovberg, Van Nostrand Reinhold Co, 1960.

The problem of controlled nuclear fusion can be subdivided into two parts. First, the fusion reactions can be produced by repetivitely triggering large numbers of microexplosions which can be contained and controlled, and, second, a container must be provided which can withstand millions of these microexplosions without deterioration and which will allow recovery of the heat generated as useful energy.

As first pointed out in my German Patent 1 022 711, neutron damage in the walls of the nuclear reaction vessel can be avoided by conducting the fusion reaction in a D-T-filled bubble that is injected into a molten mass of liquid metal between the discharge electrodes. The neutrons, the other radiations, the shock waves and the heat are absorbed nondestructively by this liquid, which thereby is heated up and transfers this heat to the associated thermodynamic power plant.

In my above-mentioned patent application I have suggested for the first time to use as a liquid a molten metal, but the poorly conducting molten salt lithium deuterotritide, $^6LiD_{1-x}T_x (0 < X < 1)$, which is lithium deuteride LiD enriched with the isotopes $^6Li$ and $^3H$. Lithium 6 is choosen because it is subject to fission into tritium and helium if it is hit by a fast neutron. Lithium 6 occurs at a concentration of 7.5% in natural lithium and is easily enriched. Lithium is abundantly available in the earth's crust. $^3H$ or tritium is chosen because its presence in nuclear reactions between deuterium and lithium lowers the requisite ignition temperature (from $10^{8\circ}$ K. to $6.10^{7\circ}$ K.). It does not occur in nature. During operation of the reactor, it enriches itself in the liquid fuel.

This new operating liquid and fuel LiD fulfills the requirements of the proposed reactor in an ideal way: Its melting point is 688° C., and it forms a liquid that is stable far above 1000° C. Its decomposition pressure is low. This high-temperature liquid permits the design of efficient Carnot cycle engines. The melting energy, and the heat capacity, of molten LiD are similar to that of water near its melting point. LiD is the best known neutron moderator. It does not become dangerously radioactive by exposure to neutrons because the product, tritium is a harmless soft beta-radiator (max. 18 keV) with 12 years half-life. The presence of the trivalent Li in the hot nucear plasma of the discharge channel is preferable to any other metal (which would have a higher order number), because the undesirable cooling of the plasma by radiation increases, for a given temperature, with the square of the charge number. Furthermore, the property of molten LiD to be an ionic conductor, not an electronic conductor, of electricity, with a conductivity lower than that of molten metals by at least two orders of magnitude, makes it possible to heat the liquid in a localized channel by current flow. Due to the exponential increase of conductivity with temperature, this current constricts itself into a narrow thread. This is not possible with metals, which have a positive temperature coefficient of resistivity.

In order to maintain a stoichiometric (or even anion-rich) composition of the melt and thereby its low electric conductivity (excess lithium would cause n-type electronic conductivity), a deuterium atmosphere must be maintained over the melt.

A typical operating cycle of the reactor according to the present invention proceeds as follows:

The capacitor 1 is charged by a suitable power supply (not shown in FIG. 1) to a voltage of the order of 100,000 volt. Before it is discharged, the liquid 3 between the electrodes 5 and 7 is preheated locally. For this purpose, an alternating current is coupled to the electrodes 5 and 7 via switches 53 and the leads 55. Due to the well-known constriction effect in conductors with negative temperature coefficient of resistivity, the current constricts itself into a fine, strongly-heated channel 9 extending as a straight line from electrode to electrode. The main discharge will then follow this performed conductivity path. The main discharge is initiated by closing the switch 41 by compressed gas 43. The piston 45 is rapidly moved into the pan 49 that is filled with liquid gallium 47, thereby making a large-area, non-welding electrical contact. The capacitor plates 29 and 31 discharge, in oscillatory form, via the electrodes 5 and 7 and the high-resistivity channel 9. The temperature in the plasma channel 9 rises to fusion temperature. The discharge is finished within $10^{-6}$ sec. The pressure shock wave in the liquid 3 is dampened by the compressibility of the hot liquid. The discharge channel disappears in the surrounding liquid, and gas bubbles rise to the gas reservoir 51. The lithium jacket 13 catches the few neutrons which penetrated the liquid 3. It is rapidly circulated by motoric action through an external heat exchanger (not shown), so that the liquid 3 is cooled down, close to its melting point, within a few seconds. A new cycle can commence. This can be repeated indefinitely, since there are no solid parts to wear out, except the electrodes. They consist essentially of beryllium, which is a participant in the thermonuclear reaction by multiplying neutrons under energy gain. Some beryllium is dissolved in the LiD liquid, where it does no harm. The excess of beryllium that vaporizes from the electrodes is collected at the bottom of the vessel 11, in the form of sludge.

As is illustrated in FIG. 1, the $^6LiD_{1-x}T_x$-filled discharge chamber is arranged in the center of a large concentric plate capacitor 1. A concentric plate capacitor was chosen because it possesses the lowest inductance and can thus be discharged in the shortest possible time, thereby achieving the highest possible momentary current. For an assumed discharge time of one microsecond, the maximum diameter of the capacitor is about 25 m, due to the propagation of the potential wave with the speed of light. For a suitable dielectric, it is advantageous to use the ceramic material lead-lanthanum zirconate-titanate (abbreviated PLZT), recently known from the field of electro-optics, or a similar material. PLZT possesses, within a well-known compositional range, a static dielectric constant of 5000, and a dynamic dielectric constant (for light waves) of 10. The latter is important for the rapid discharge.

For the thickness of the dielectric we assumed the value of 1 cm, so that it can stand the voltage of 100,000 volts without breakdown. Large rectangular plates, with grooved edges so that they fit together like shingles, can be prepared by hot-pressing and sintering, and successive grinding. These plates are metallized on both sides. These shingles 19 can be electrically connected with each other at their butted joints by means of the soldered-on strips 21. The crevices at the joints are filled with a high-dielectric zirconiatitania cement.

Using these preformed plates, it is simpler to build a concentric plate capacitor whose plates consist of stripes 23 (see FIG. 2) which converge radially to the center dome, rather than a capacitor with circular disks as proposed earlier.

At the center, each stripe 23 is connected to the discharge electrode 5 or 7 by a bow 25, via large-area contacts 27.

In order to avoid short circuits, the external, massive reaction chamber wall 33, and the inner, flexible chamber wall 11, are electrically insulated from the electrodes 5 and 7 by ceramic form pieces 35. They can be made, for example, from hot-pressed, sintered beryllium oxide BeO, because of its proven resistance to Li, and due to its property to multiply electrons. Suitably-shaped flanges prevent the liquids 3 and 13 from oozing through the crevices.

The wall 11 of the LiD-filled inner chamber 3 is made of thin metal sheet into which large numbers of grooves, dimples and folds have been embossed so that it is elastic and not easily fatigued by the shock waves which it has to transmit to the external lithium jacket 13. We have to keep in mind that the power of each microexplosion equals that of 1 kg TNT.

It is known that Ti, Zr, V, Ta, Mo and W are the metals most suited to sustain the chemical attack of molten Li and LiD. They are also most resistive to neutron damage. However, most of the neutrons are absorbed by the LiD before reaching the walls 11.

The external lithium jacket 13 has the task to catch the residual neutrons before they can cause harm to the environment, and to form the last buffer for the shock waves before they hit the solid wall 33. Due to its large extended liquid range and relatively low vapor pressure, lithium is very suitable to transport the reaction heat that is generated in the liquid 3, to the heat exchanger. The pipes 15 contain check valves (not shown) so that the lithium can not escape through the pipes 15 when the pressure waves arrive. This would place undue strain on the thin container wall 11. The rapid circulation of the liquid lithium to the heat exchanger can be accomplished, for example, by an electromagnetic pump.

Before the reactor can become operational for the first time, the solid LiD that fills the chamber 3, and the solid Li in the jacket 13, have to be melted by the heater 37.

The electrodes 5 and 7 consist of thick metal rods which can be made of Mo, W, Nb, V, Ti, Zr or similar, but also of Be and its alloys. To compensate for erosion, the electrodes can be made to contain, as an inner core, the movable rods 39. This rod 39 can consist of a different material then the electrodes 5 and 7, for example of Be. By using Be, the unavoidable cooling of the hot fusion plasma at the electrodes can be converted into an advantage.

There is no danger that the reactor can become supercritical and explode like a hydrogen bonb, because the n-D-T-Li chain reactions can proceed only in a dense plasma, not in a liquid. The energy released in each microexplosion is totally insufficient to convert the liquid 3 into the plasma state. The multiplication factor of the nuclear chain reactions in a LiD plasma is below 1 (see R. McNally, Jr., Oak Ridge National Laboratory, Tennessee, Conference Paper 730302-2: "Nuclear Fusion Chain Reaction Applications in Physics and Astrophysics", 1972), and the chains die out abruptly in an unionized liquid or solid because the charged particles are stopped by the energy losses needed to ionize the matter through which they have to fly.

The discharge switch 41 which initiates the capacitor discharge, can consist of an Ignitron, or a Spark-Gap, as is well known in the art (see, e.g., E. L. Kemp in IEEE Trans. Nuclear Science NS-20, page 446, February 1973). However, it is believed that the switch 41 that is illustrated in FIG. 1 in principle, has a lower voltage drop and a longer useable life. It was already mentioned in my German Pat. No. 1,022,711 of 1956.

The uppermost space of the reaction vessel 3 contains gaseous deuterium 51 which prevents the melt from becoming lithium-rich and thus electronically conducting.

As already mentioned, the formation of the initial conductivity path between the electrodes 5 and 7 is achieved by local heating produced by combined high-frequency induction and ohmic current heating. At the beginning of each working cycle, RF current from a common RF generator (not shown in the figure, for example 5 kV, 100,000 Hz) is coupled to the electrodes via the switches 53. The time needed for this preheating and channel formation is much longer, and the power required is much lower, then that for the main discharge. It can be the order of 1 sec. The liquid in the channel is heated to about 1000° C., whereas the bulk of the liquid remains at a temperature slightly higher than its melting point.

During the capacitor discharge, about one megajoule of electrical energy is imparted to the material in the channel. It is assumed that about 10 times as much fusion energy is generated. The volume of the liquid-filled reactor chamber 3 must therefore be at least 1 $m^3$, so that the overall temperature increase, after the microexplosion is over and everything has homogenized, does not exceed a few hundred degrees. If heated much over 1000° C., the liquid LiD will develop a decomposition pressure that exceeds 1 atm, and it may start to foam. (This foaming will occur near the discharge channel during the microexplosion, and it may be beneficial there because it helps to dampen the outgoing shock waves before they hit the walls 11 and 33).

During the capacitor discharge, the momentary current may be in the order of $10^9$ A and may oscillate a few times because of the residual inductivity of the circuit. Due to the enormous temperature rise in the channel, the pressure may rise to about $10^5$ atm. The surrounding liquid prevents the channel from bursting outward. It also confines, and reflects back, the radiation emitted by the channel, thus allowing higher temperatures than the ones achieved in wire explosions. The current constricts itself, due to its own magnetic forces. The harmful Z-Pinch, which is so disturbing in gas discharges, can not occur here because of the guidance afforded by the liquid walls (the surrounding liquid simply can not yield to a kink within $10^{-6}$ sec). The other well-known instability, the sausage-effect, does occur; however it is known to be beneficial since it creates accelerated ion packages which shoot into each other, leading to suprathermal fusion events.

Due to the high particle density in the channel (assumed to be $10^{21}$ cm$^{-3}$), the well-known Lawson condition n.$\tau=10^{14}$ can be satisfied in the $10^{-7}$ sec during which the fusion temperature may be reached. Due to this high density, the mean free path of the hot nucleons is short so that energy losses at the cold electrodes are not significant. (Besides, they are compensated for by the excess neutrons that are created at the Be electrodes).

It must be emphasized that the reactor according to the present invention automatically achieves the recuperation of the electrical energy that is expended for its operation, with the efficiency of the associated turbogenerator power plant (30%).

The reactor of the present invention is generally similar in structure and operation to that of the abovementioned prior application but differs in the manner in which the transitory reaction zones are repetitively established and in the manner in which the fusion reactions occur.

In the former reactor, the pre-heating of the LiD-liquid was carried out so far until a big bubble had formed by decomposition of the liquid. Only then was the capacitor discharge initiated, so that the current would flow along the wall of the bubble. With the reactor of the present invention, the preheating is milder so that only a conductivity path is preformed. During the main discharge, the long, narrow plasma channel that forms could be considered being a very elongated bubble. However, the current flows in its center, not along the walls.

New features of the present invention are the use of berylliumcontaining electrodes, and the occurrence of n-Li-T-D chain reactions in the plasma channel.

What I claim is:

1. A nuclear fusion reactor comprising a reaction chamber containing a liquid conductive medium, means for repetitively establishing a reaction zone in said medium, means for producing a high current electrical discharge through said reaction zone upon each reestablishment thereof, and means for absorbing heat generated by the resulting fusion reactions, said conductive medium including lithium deuteride.

2. A fusion reactor as defined in claim 1 in which said lithium deuteride is enriched with lithium-6 and tritium.

3. A fusion reactor as defined in claim 1 including means for repeatedly preheating a current path through said conductive medium to repetitively establish transitory reaction zones.

4. A fusion reactor as defined in claim 3 in which said preheating means comprises means for supplying pulses of high frequency alternating current to said current path.

5. A fusion reactor as defined in claim 1 and including an outer container enclosing said reaction chamber, a heat exchange liquid filling said outer container, and means for circulating said liquid through the container to absorb heat and transfer it to an external system.

6. A fusion reactor as defined in claim 5 in which said heat exchange liquid comprises molten lithium.

7. A nuclear fusion reactor comprising a reaction chamber containing a liquid conductive medium including lithium deuteride, a pair of opposed, insulated electrodes extending into said reaction chamber, means for repetitively supplying pulses of high frequency alternating current to said electrodes to flow through said conductive medium and establish transitory preheated current paths between the electrodes, means for applying a high current electrical discharge to said electrodes upon each reestablishment of the current path, and means for absorbing heat generated by the resulting fusion reaction.

8. A fusion reactor as defined in claim 7 in which said liquid conductive medium comprises lithium deuteride enriched with lithium-6 and tritium.

9. A fusion reactor as defined in claim 7 in which said reaction chamber encloses an open space above said liquid medium, and said space contains gaseous deuterium.

10. A fusion reactor as defined in claim 7 in which said electrodes contain beryllium.

11. A fusion reactor as defined in claim 7 and including an outer container enclosing said reaction chamber, said container having substantially rigid walls and containing a heat exchange liquid surrounding the reaction chamber to absorb heat generated therein, and means for circulating said liquid to transfer the heat to an external system.

12. A fusion reactor as defined in claim 11 in which the heat exchange liquid is molten lithium.

13. A fusion reactor as defined in claim 11 in which said reaction chamber has metal walls of sufficient elasticity to absorb mechanical shock waves.

* * * * *